United States Patent [19]

Daniels

[11] Patent Number: 5,122,167
[45] Date of Patent: Jun. 16, 1992

[54] FREE-FLOW GAS FILTER ASSEMBLY

[75] Inventor: Keith L. Daniels, Morgantown, Pa.

[73] Assignee: SKD Pneumatics Inc., Morgantown, Pa.

[21] Appl. No.: 456,380

[22] Filed: Dec. 26, 1989

[51] Int. Cl.$^5$ .............................................. B01D 19/00
[52] U.S. Cl. ........................................ 55/97; 55/216; 55/219; 55/387; 55/524; 137/195
[58] Field of Search ................. 604/126; 55/213, 215, 55/216, 218, 219, 504, 524, 387; 137/192, 195, 173; 210/496, 497.01, 510.1, 504, 446

[56] References Cited

U.S. PATENT DOCUMENTS

| | | | |
|---|---|---|---|
| 1,531,096 | 3/1925 | Hoffman | 55/486 |
| 2,058,189 | 10/1936 | Stuard | 137/103 |
| 2,402,140 | 6/1946 | Heintzelman | 55/486 |
| 2,521,785 | 9/1950 | Goodloe | 55/97 |
| 2,771,533 | 11/1956 | Osberg et al. | 219/19 |
| 3,252,270 | 5/1966 | Pall et al. | 55/74 |
| 3,257,783 | 6/1966 | Baker et al. | 55/498 |
| 3,303,634 | 2/1967 | Berrian | 55/35 |
| 3,364,658 | 1/1968 | Walker | 55/171 |
| 3,415,041 | 12/1968 | Kraissl, Jr. | 55/342 |
| 3,650,093 | 3/1972 | Rosenberg | 55/159 |
| 3,680,287 | 8/1972 | Wood et al. | 55/524 |
| 3,803,810 | 4/1974 | Rosenberg | 604/126 |
| 3,980,457 | 9/1976 | Smith | 55/219 |
| 4,226,179 | 10/1980 | Sheldon, III et al. | 99/475 |
| 4,336,043 | 6/1982 | Aonuma et al. | 55/483 |
| 4,409,005 | 10/1983 | McKendrick | 55/218 |
| 4,487,618 | 12/1984 | Mann | 55/179 |
| 4,604,205 | 8/1986 | Ayers | 55/524 |
| 4,707,168 | 11/1987 | Mizutani | 55/274 |
| 4,801,313 | 1/1989 | Mann | 55/323 |
| 4,822,387 | 4/1989 | Daniels | 55/323 |

FOREIGN PATENT DOCUMENTS 0138578  4/1985  European Pat. Off. .
WO8700439  1/1987  PCT Int'l Appl. .

Primary Examiner—Bernard Nozick
Attorney, Agent, or Firm—John F. A. Earley; John F. A. Earley, III

[57] ABSTRACT

A gas filter assembly for filtering pressurized gas comprises a body with a gas inlet port and a gas outlet port with a central passageway extending downwardly from the inner end of the outlet port, a bowl connected to the bottom portion of the body with a bottom opening that allows liquid to drain from the bowl, a filter cartridge assembly positioned in the gas filter assembly and including a filter element attached to the bottom of the body around the central passageway so that all gas flowing through the gas filter assembly flows through the filter element, the filter element comprising a porous filter material with pores that pass gas when the filter element is dry, but prevent passage of water and gas therethrough when wetted, and a drain in the bottom opening for draining liquid from the bowl, whereby when the liquid level of the bowl rises and covers the filter element, the filter element swells and prevents gas and liquid from flowing through the gas filter assembly.

10 Claims, 2 Drawing Sheets

FREE-FLOW GAS FILTER ASSEMBLY

BACKGROUND OF THE INVENTION

1. Field of the Invention

This invention relates to a gas filter assembly, and more particularly concerns a free-flow gas filter assembly that uses a filter element to filter dirt and water from a gas.

2. Description of the Prior Art

Gas cools as it travels through piping, causing moisture in the gas to form condensation in the pipes. The condensation must be removed in order for pneumatic equipment to operate properly.

The removal of the condensation from the piping is particularly critical in today's sophisticated pneumatic equipment. For example, pneumatic equipment in dental offices and in computer installations requires that no moisture be allowed in the pneumatic gas line.

Conventional gas filter assemblies have baffles and spinners that separate water and dirt from gas by creating a whirling motion in the filter assembly that throws the gas against an inside wall. The moisture in the gas condenses on the walls, falls to the bottom of the assembly, and is drained away.

Other gas filter assemblies filter gas by positioning barriers in the path of the gas so that the moisture in the gas coalesces on the barriers and drops into the bottom of the filter assembly where it is drained.

Other means of condensing the moisture in a gas in a filter assembly may be used, such as passing the gas through wire, fiber pads, or other spirally-wound fiber materials. The devices may be single stage or double stage.

A problem with conventional filter assemblies is that while they separate dirt and water from the gas, the drain often malfunctions and does not allow water to drain from the filter assembly. Consequently, water fills the filter assembly and passes through it to the downstream piping.

Still another means for condensing the moisture in the gas is to pass the gas through a porous filter element. The gas passes through the filter element, but the moisture in the gas does not pass through and instead forms droplets on the outside surface of the filter element that drop into the bottom of the gas filter assembly and are drained from the assembly. The filter element may be made of polyethylene.

Disadvantageously, polyethylene does not prevent the passage of water therethrough if the drain in the filter assembly fails, and the water rises in the bottom of the filter assembly and covers the polyethylene filter element. The pressure of the gas entering the filter assembly forces water through the polyethylene filter element and into the downstream piping.

SUMMARY OF THE INVENTION

It is an object of this invention to provide a free-flow gas filter assembly that separates water and dirt from a gas but does not use conventional baffles and spinners to do so.

Another object of the invention is to provide a free-flow gas filter assembly that prevents water from flowing through the assembly if the drain fails and water fills the gas filter assembly.

In accordance with these and other objects of the invention, there is shown a free-flow gas filter assembly for filtering pressurized gas comprising a body with a gas inlet port and a gas outlet port with a central passageway extending downwardly from the outlet port, a bowl connected to the bottom portion of the body with a bottom opening that allows liquid to drain from the bowl, a filter cartridge assembly including a filter element attached to the bottom of the body and around the central passageway so that all gas flowing through the ga filter assembly flows through the filter element, the filter element comprising a porous filter material with pores that pass gas when the filter element is dry, but prevent the passage of gas and dirt on being wetted because the material swells and closes the pores, and a drain in the bottom opening of the bowl for draining liquid from the bowl, whereby when the liquid level in the bowl rises and covers the filter element, the filter element swells and prevents gas and liquid from flowing through the gas filter assembly.

There is also shown an in-line gas filter assembly for insertion in a pressurized gas line comprising a housing having a chamber and a cap, a filter element positioned in the housing and comprising a porous filter material with pores that pass air when the filter element is dry, but swell when being wetted to prevent the passage of water and gas therethrough.

DETAILED DESCRIPTION

Figure 1:
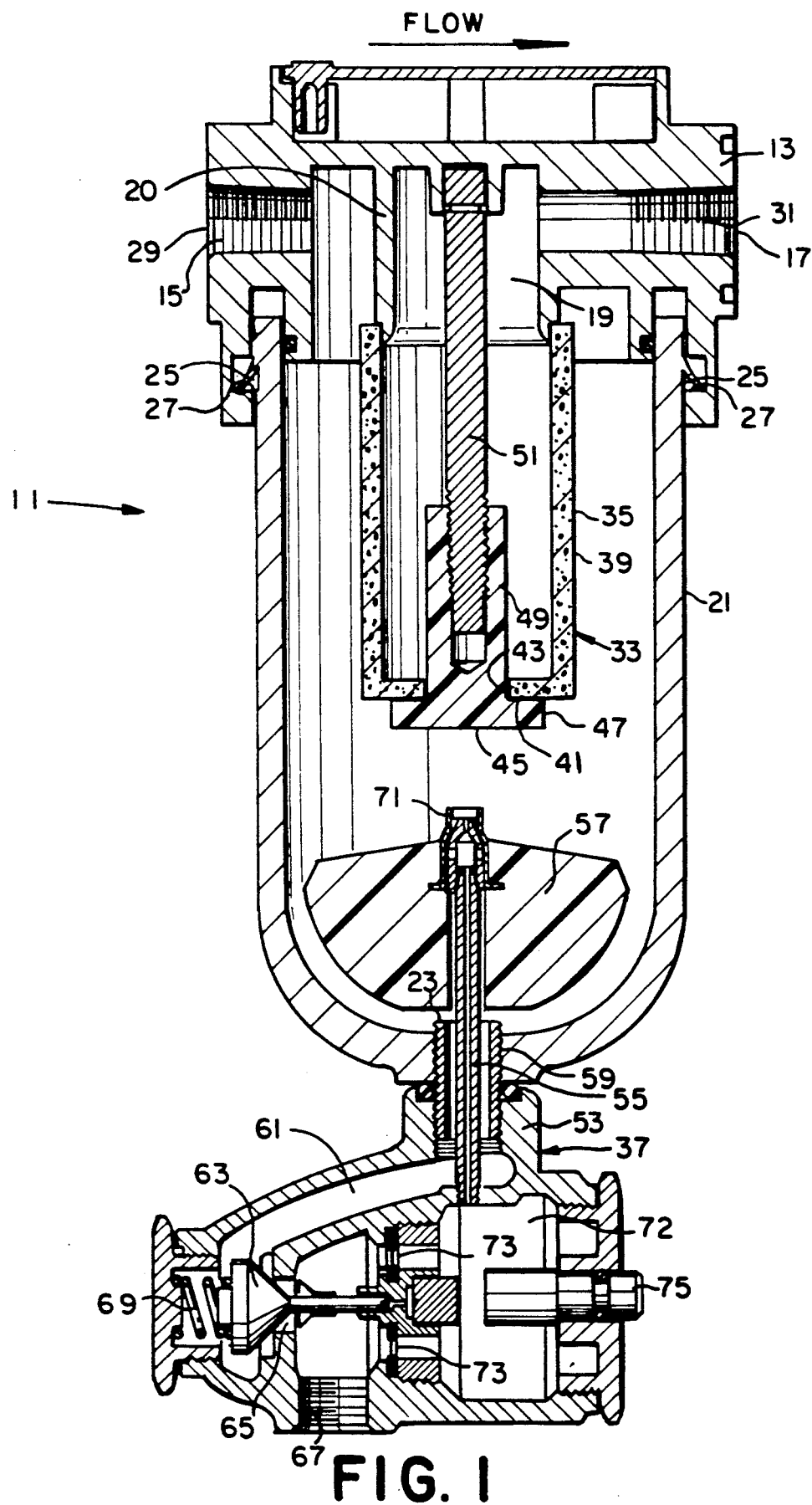
FIG. 1 is a view in vertical cross-section of a gas filter assembly constructed in accordance with the invention.

Turning now to the drawings, there is shown in FIG. 1 a gas filter assembly 11 for filtering pressurized gas comprising a body 13 with a gas inlet port 15 and a gas outlet port 17 with a central passageway 19 extending downwardly from the inner end of gas outlet port 17, a bowl 21 with a bottom opening 23 that allows liquid to drain from bowl 21, means for connecting the lower portion of the body 13 to the upper portion of the bowl 21, and a filter element 35 positioned inside the gas filter assembly.

The connecting means for connecting bowl 21 to body 13 includes a plurality of spaced-apart, wedge-shaped protrusions 25 formed around the upper portion of bowl 21 that extend outwardly from bowl 21 and rest on a plurality of spaced-apart shelves or shoulders 27 formed around the inner circumference of the lower portion of the body 13. A slidable spring-backed projection tongue on bowl 21 slides up and wedges between the pairs of protrusions 25 and shelves 27 and prevents protrusions 25 from rotating off the shelves 27 so that the bowl 21 does not become disconnected from the body 13.

Means, such as threads 29, are formed in gas inlet port 15 for connecting gas inlet port 15 to a gas line extending from a source of pressurized gas. Similarly, means, such as threads 31, are formed in gas outlet port 17 for connecting gas outlet port 17 to a downstream gas line.

Filter cartridge assembly 33 is connected to central passageway 19 and includes a filter element 35 attached to the central passageway 19 so that all gas flowing through gas filter assembly 11 flows from inlet 15 into bowl 21 and through filter element 35 from the outside of filter element 35 to the inside.

Filter element 35 is made of porous filter material with pores for passing air when the filter element 35 is dry, and for preventing the passage of water and gas through filter element 35 when filter element 35 is wet because the filter material swells and closes the pores.

Drain means, such as solenoid drain 37, is positioned in bottom opening 23 of the bowl 21 for draining liquid from the bowl.

If solenoid drain 37 fails to drain the water in the bowl, the liquid in the bowl 21 rises and covers filter element 35 causing the material in filter element 35 to swell and close its pores and prevent gas and liquid from flowing through the filter.

A porous filter material which may be used is disclosed in PCT application No. PCT/US 86/01502, filed on Jul. 14, 1986 by General Polymeric Corporation, which is incorporated herein by reference, and is a water-insoluble, highly water-absorbent material comprising synthesized resins, including, for example, chemically treated, naturally occurring polymeric materials and synthetic polymeric materials prepared by polymerization of monomers. An exemplary class of materials prepared from chemically treating naturally occurring polymeric materials comprises those which are synthesized from naturally occurring polymeric materials such as, for example, carboxymethylcelluloses, polysaccharides such as, for example, starch, and natural gums such as guar gum, and from vinyl compounds which are reactive therewith.

A preferred water-insoluble, highly water-absorbent material is a graft starch polymer, but other water-insoluble, highly water-absorbent materials, such as cross-linked poly(alkylene oxide) resins, cross-linked polyacrylate resins, and cross-linked carboxy methylcellulose resins may be used in the practice of the invention. Species of such resins are known and include materials which are available commercially.

Examples of commercially available water-absorbent resins include the following trademark products sold by Grain Processing Corporation: Water-Lock A-100 characterized as being insoluble in most organic solvents and having the ability to absorb at least 110 ml of water/g of resin; Water-Lock J-500 characterized as being capable of absorbing at least about 500 ml of water/g of resin; and Water-Lock J-550 characterized as being capable of absorbing at least 375 ml of water/g of resin. Such resins are described by their manufacturer as being super absorbent products which are prepared by hydrolyzing starch/acrylonitrile graft copolymers to form polymeric products having side chains which contain carboxamide and carboxylate groups. The aforementioned resins are available commercially as free flowing powders. Other sources of the resins include Arakawa Chemical (U.S.A.) Inc. which sells its resins under the trademark "ARASORB" and Sanyo Chemical, Unilever, Hercules and Dow Chemical.

Filter element 35 may be made entirely from the water-insoluble, highly water-absorbent material or a mixture of such materials, or it may be made from such material(s) and one or more other materials, including major amounts of such other materials. Examples of classes of such other materials include carriers, fillers, and additives which improve the physical and/or chemical properties of the composition comprising the device. In this regard, filter element 35 may comprise, for example, polyethylene, acrylic resin, and nylon (to name but a few), a filler material(s) such as, for example, calcium carbonate, lubricant, anti-oxidant, fibers, including both synthetic and natural fibers, and materials which modify one or more of the aesthetic, physical and chemical properties of the composition, for example, molybdenum disulfide. Synthetic resins which are capable of being sintered can be used to good advantage in the practice of the present invention. Polyolefins, particularly polyethylenes and polypropylenes, are preferred examples of such materials.

An attractive feature of the present invention is that relatively small amounts of the highly water-absorbent resin may be used in fabricating filter element 35. Thus, a minor amount of the resin may be combined with a major amount of the carrier or filler material(s), including material(s) which is less costly than the water-absorbent resin. In addition to cost advantages, the strength of filter element 35 may be improved by the use of a carrier material, preferred materials being polyethylenes, and polypropylenes having a molecular weight of at least about 900,000 to several million. Lower molecular weight polyolefins whose molecular weight can be increased by chemical modification such as, for example, irradiation and peroxide treatment of the polymer, may be be used also. It is preferred also that the melt index of such polymeric materials be less than 1. Based on cost, ease of manufacture, and performance, polyethylenes having a molecular weight of at least about 2.5 million and a melt index below 1 are particularly desirable material for use in the present invention. Recommended commercial products are those sold under the trademark HOSTALEN GUR and HIMONT, for example HOSTALEN GUR 412, 413 and 415, and HIMONT HB 312.

Accordingly, the amount of water-absorbent resin comprising the fluid-control device may vary over a wide range, the minimum amount being dictated by that needed to block the passage of the gas through filter element 35 as it is contacted therewith, and the maximum amount being about 100 wt.% of the resin. For example, a filter element 35 within the present invention may comprise about 0.5 to about 99 wt.% of the water-absorbent resin and about 1 to about 99.5 wt.% of filler. Preferred amounts of constituents comprise about 5 to about 15 wt.% resin and about 85 to about 95 wt.% filler.

Filter element 35 is cup-shaped and includes a cylindrical sidewall 39 extending upwardly from a bottom wall 41 having a bottom opening 43.

The top of filter element 35 is positioned around central passageway 19 so that filter element sidewall 39 abuts against the bottom portion of a wall 20 in body 13 that forms central passageway 19. Filter element 35 is held in position by a cap 45 having a head portion 47 which is wider than its stem 49 which has an internally threaded bore. Stem 49 fits snugly in filter element opening 43 and threadably engages a stud 51 that has an upper end that is fixedly mounted in the underside of body 13. Head portion 47 fits snugly against the underside of filter element bottom wall 41 to form a tight seal.

The pores of filter element 35 have a pore size of about 10 microns.

A solenoid drain 37 is shown in FIG. 1 and is an automatic drain assembly model M-MB-MJ, made by Watts Fluidair Inc. of Kittery, Me. Solenoid drain 37 is threadably mounted to bottom opening 23 in bowl 21, and includes a bonnet 53 that extends below bowl 21, a valve stem 55 that is mounted in drain bonnet 53 and extends upwardly through bottom opening 23 into bowl 21, and a float 57 mounted near the top of valve stem 55 inside bowl 21. Bonnet 53 is connected to bowl 21 by a hollow, externally-threaded sleeve 59 that engages the top portion of bonnet 53 and the internally-threaded opening 23 of bowl 21.

As liquid collects in the bottom of bowl 21, it rises and flows down through hollow sleeve 59 into a chamber 61 in bonnet 53. The liquid is prevented from flowing out of bonnet 53 by a plug or disc 63 which blocks an exit opening 65 that leads to a drainage port 67. A spring 69 in bonnet 53 exerts pressure against plug 63 to seal exit opening 65. As liquid collects in the bottom of bowl 21, float 57 rises with the liquid level, which opens a valve 71 located near the top of valve stem 55. As valve 71 opens, air flows downwardly through valve stem 55 and into an diaphragm chamber 72 of bonnet 53, where the air exerts pressure against a diaphragm 73. A stem 75 is connected at one end to plug 63 and at the other end to diaphragm 73 and, as the air flowing through valve stem 55 exerts pressure against diaphragm 73, diaphragm 73 pushes against stem 75 and plug 63, causing plug 63 to move away from exit opening 65, and allowing the liquid to drain from the bottom of bowl 21 through drainage port 67.

As the liquid exits from bowl 21, float 57 moves downwardly until valve 71 closes off the air flow to valve stem 55. The strength of disc spring 69 overcomes the decreased pressure against diaphragm 73, causing plug 63 to close exit opening 65.

Figure 2:
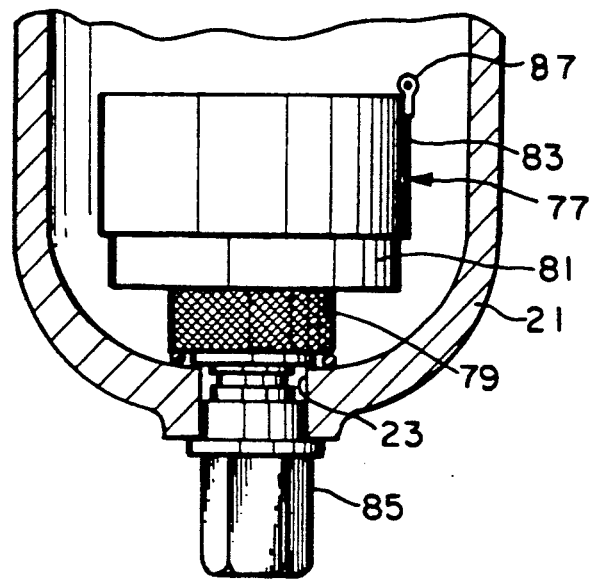
FIG. 2 is a fragmentary view in cross-section showing an alternative embodiment of the drain means.

Another embodiment of the drain means is float drain 77 shown in FIG. 2, which is an automatic mechanical drain model GRP-95-714 made by Wilkerson Company of Englewood, Colo. 80150 and is described in the Wilkerson Service Manual, which is incorporated herein by reference. Float drain 77 includes a screen 79 positioned over bottom opening 23 in bowl 21, a body 81 mounted on screen 79, and a float 83 mounted on body 81. A hollow valve stem is positioned in body 81 and includes an upper portion which extends upwardly through body 81 and float 83 to near the top of float 83, and a lower portion that extends through body 81, screen 79 and through bottom opening 23. The lower portion of the stem is connected to an adapter nut 85 that holds float drain 77 securely in bowl 21. A float lever arm 87 is mounted on the top of the valve stem to close off the opening at the top of the valve stem.

As liquid collects in the bottom of bowl 21, float 83 rises, causing float lever arm 87 to rise and allowing air to pass into the valve stem, which opens screen 79 to allow liquid to drain from bowl 21.

Figure 3:
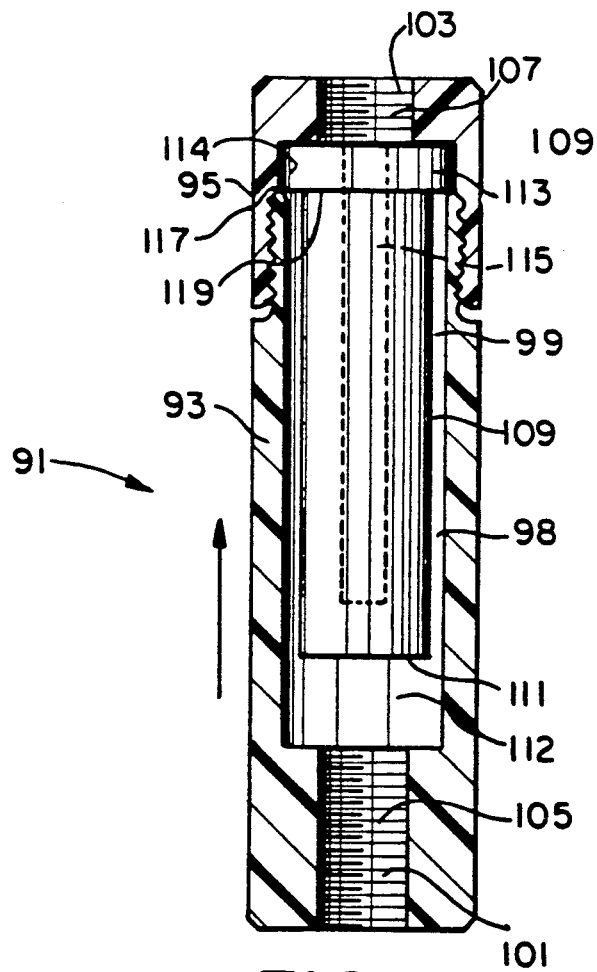
FIG. 3 is a view in cross-section of an in-line gas filter assembly constructed in accordance with the invention.

Turning now to FIG. 3, there is shown an in-line gas filter assembly 91 for insertion in a pressurized gas line which comprises a housing 93 having a cap 95. Cap 95 and housing 93 form a chamber 98. A filter element 99 is positioned in chamber 98 and comprises a cup-like element of porous filter material with pores for passing air when filter element 99 is dry, and for preventing the passage of water and gas therethrough when the filter element swells upon being wetted.

Filter element 99 may be identical in composition to filter element 35 described above, but has a somewhat different shape.

Filter housing 93 includes an internally-threaded gas inlet port 101 formed in the bottom portion of housing 93 which is adapted to be connected to an incoming gas line, and a gas outlet port 103 formed in ca portion 95 which is adapted for connection to an outgoing gas line. Means, such as threads 105, are formed in gas inlet port 101 for connecting port 101 to a gas line leading from a source of pressurized gas, and similar means, such as internal threads 107, are formed in gas outlet port 103 for connecting gas outlet port 103 to a downstream gas line.

Filter element 99 is positioned in housing 93 so that all gas entering the in-line gas filter assembly flows through filter element 99 from the outside of the filter element 99 to its inside.

Filter element 99 is cup-like in shape and has a cylindrical sidewall 109 extending upwardly from a flat bottom wall 111, and an annular flange or collar 113 extending outwardly from the to portion of sidewall 109.

An axial bore 115 extends from bottom wall 111 through the top of element 99 and connects to a gas outlet port 103 in cap 95.

Filter element 99 is shorter in length than chamber 98 and fits therein so that there is an open space 112 in chamber 98 between the bottom wall 111 of the filter element and ga inlet port 101.

The outside diameter of flange 113 is a little larger than the diameter of chamber 98 and a little smaller than the diameter of a recess 114 in cap 95 that seats flange 113 snugly. The flange 113 is held in recess 114 by the top surface 117 of housing 93 that abuts the bottom surface 11 of flange 113. The top portion of housing 93 is recessed and is externally threaded and screws into the lower portion of cap 95 which is internally threaded. Air passing through filter assembly 91 contacts sidewall 109 and bottom wall 111 of filter element 99, passes from chamber 98 through the filter element to axial bore 115, and out of gas filter assembly 91 through gas outlet port 103. Moisture, on the other hand, condenses on the outside surface of filter element 99 and drops into chamber 98 until the water in chamber 98 accumulates and rises in chamber 98 to contact filter element 99 and close its pores and prevent the passage of air and water through the filter element 99, whereupon the chamber is emptied of water and the filter element 99 is replaced with a new filter element.

I claim:

1. A gas filter assembly for filtering pressurized gas comprising a body with a gas inlet port and a gas outlet port with a central passageway extending downwardly from the inner end of the outlet port, a bowl attached to the bottom portion of the body, the bowl having a bottom opening that allows liquid to drain from the bowl, means for connecting the upper portion of the bowl to the lower portion of the body, means in the gas inlet port for connecting the gas inlet port to a gas line leading to a source of pressurized gas, means in the gas outlet port for connecting the gas outlet port to a downstream gas line, hollow longitudinal filter element means attached to the bottom of the body around the inlet to the central passageway for passing all gas flowing through the gas filter assembly therethrough, the filter element means comprising a filter element of porous filter material with pores that pass gas when the filter element is dry but swell on being wetted to prevent passage of water and gas therethrough, and drain means positioned at the bottom of the bowl for draining liquid from the bowl, comprising a float disposed in the bowl adjacent to the bottom opening, a valve extending through the float and the bottom opening, and a body, whereby the float rises as the liquid accumulates at the bottom of the bowl, thereby opening the valve and allowing the liquid to drain through the bottom opening, whereby when the liquid level in the bowl rises and covers the filter element, the filter element swells and prevents gas and liquid from flowing through the gas filter assembly.

2. The gas filter assembly of claim 1, wherein the filter element has a cylindrical wall extending upwardly from a flat bottom wall.

3. The gas filter assembly of claim 1, wherein the pores of the filter element have a pore size of about 10 microns.

4. The gas filter assembly of claim 1, wherein the porous filter material in the filter element comprises a water insoluble, water absorbent material.

5. The gas filter assembly of claim 4, wherein the water insoluble, water absorbent material is a hydrolyzed starch/acrylonitrile graft copolymer.

6. The gas filter assembly of claim 1, wherein the porous filter material in the filter element includes a carrier material.

7. The gas filter assembly of claim 6, wherein the carrier material is polyethylene.

8. A gas filter assembly for filtering pressurized gas comprising
  a body with a gas inlet port and a gas outlet port with a central passageway extending downwardly form the inner end of the outlet port,
  a bowl attached to the bottom portion of the body with a bottom opening that allows liquid to drain form the bowl,
  means connecting the upper portion of the bowl to the lower portion of the body,
  means in the gas inlet port for connecting the gas inlet port to a gas line leading to a source of pressurized gas,
  means in the gas outlet port for connecting the gas outlet port to a downstream gas line,
  hollow longitudinal filter element means attached to the bottom of the body around the inlet to the central passageway for passing all gas flowing through the gas filter assembly therethrough,
  the filter element means comprising a filter element of porous filter material with pores that pass gas when the filter element is dry but swell on being wetted to prevent passage of water and gas therethrough, and
  drain means positioned at the bottom of the bowl for draining liquid from the bowl, comprising a float disposed in the bowl adjacent to the bottom opening, a valve extending through the float and the bottom opening, and a body, whereby the float rises as the liquid accumulates at the bottom of the bowl, thereby opening the valve and allowing the liquid to drain through the bottom opening,
  whereby when the liquid level in the bowl rises and covers the filter element, the filter element swells and prevents gas and liquid from flowing through the gas filter assembly,
  the porous filter material in the filter element comprises a water insoluble, water absorbent material,
  the water insoluble, water absorbent material being a hydrolyzed starch/acrylonitrile graft copolymer.
  the porous filter material in the filter element including a carrier material,
  the carrier material is polyethylene,
  the filter element having a cylindrical wall extending upwardly form a flat bottom wall, and
  the pores of the filter element having a pore size of about 10 microns.

9. A gas filter assembly for filtering pressurized gas comprising
  a housing having a chamber formed therein,
  a gas outlet port formed in the housing,
  a gas inlet port formed in the housing,
  means in the gas inlet port for connecting the gas inlet port to a gas line leading to a source of pressurized gas, and
  means in the gas outlet port for connecting the gas outlet port to a downstream gas line,
  hollow longitudinal filter element means positioned in the housing connected to said outlet for passing all gas entering the gas filter assembly therethrough,
  the filter element means comprising a filter element of porous filter material with pores that pass gas when dry but swell on being wetted to prevent passage of water and gas therethrough, and
  drain means positioned at the bottom of the bowl for draining liquid from the bowl, comprising a float disposed in the bowl adjacent to the bottom opening, a valve extending through the float and the bottom opening, and a body, whereby the float rises as the liquid accumulates at the bottom of the bowl, thereby opening the valve and allowing the liquid to drain through the bottom opening,
  whereby when the liquid level covers the filter element the filter element swells and closes its pores and prevents gas and liquid from flowing through the gas filter assembly.

10. A method of filtering compressed gases comprising the steps of
  providing a gas filter assembly comprising a body with a gas inlet port and a gas outlet port with a central passageway extending downwardly form the inner end of the outlet port, a bowl attached to the bottom portion of the body with the bowl having a bottom opening that allows liquid to drain from the bowl, means connecting the upper portion of the bowl to the lower portion of the body, hollow longitudinal filter element means attached to the bottom of the body around the inlet to the central passageway for passing all gas flowing through the gas filter assembly therethrough, the filter element means comprising a filter element of porous filter material with pores that pass gas when the filter element is dry but swell on being wetted to prevent passage of water and gas therethrough, and drain means positioned at the bottom of the bowl for draining liquid from the bowl, comprising a float disposed in the bowl adjacent to the bottom opening, a valve extending through the float and the bottom opening, and a body, whereby the float rises as the liquid accumulates at the bottom of the bowl, thereby opening the valve and allowing the liquid to drain through the bottom opening,
  supplying a pressurized gas to the inlet port of the body,
  passing the gas through the gas filter assembly and through the filter element,
  condensing the liquid in the gas onto the filter element and dropping it into the bowl,
  raising the float as the liquid accumulates at the bottom of the bowl, opening the valve as the float rises to remove liquid from the bowl of the gas filter assembly, preventing gas and liquid from passing through the gas filter assembly upon failure of the drain means by allowing the liquid in the bowl to contact the filter element, and causing the filter element to swell and close the pores in the filter element to prevent gas and liquid from flowing therethrough.

* * * * *